(12) United States Patent
Fieret et al.

(10) Patent No.: US 11,084,116 B2
(45) Date of Patent: Aug. 10, 2021

(54) OZONE SUPPLY UNIT AND METHOD FOR PROVIDING OZONE FOR A FLAME BURNER APPARATUS AND/OR FOR AN OXYGEN CUTTING APPARATUS

(71) Applicant: LINDE AKTIENGESELLSCHAFT, Munich (DE)

(72) Inventors: Jacob Fieret, Basingstoke (GB); Erwan Siewert, Niederlauterbach (DE); Ernst Miklos, Kirchheim (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 105 days.

(21) Appl. No.: 16/279,527

(22) Filed: Feb. 19, 2019

(65) Prior Publication Data
US 2019/0255645 A1 Aug. 22, 2019

(30) Foreign Application Priority Data
Feb. 20, 2018 (GB) ..................... 1802685

(51) Int. Cl.
*B23K 10/00* (2006.01)
*B23K 7/10* (2006.01)
(Continued)

(52) U.S. Cl.
CPC ............... *B23K 10/00* (2013.01); *B23K 7/002* (2013.01); *B23K 7/08* (2013.01); *B23K 7/10* (2013.01);
(Continued)

(58) Field of Classification Search
CPC .......... B23K 10/00; B23K 7/10; B23K 7/002; B23K 7/08; B23K 26/38; B23K 26/14;
(Continued)

(56) References Cited

U.S. PATENT DOCUMENTS 2,658,868 A * 11/1953 Collison ................. C01B 13/11
422/186.15
5,012,286 A 4/1991 Kawano et al.
(Continued)

FOREIGN PATENT DOCUMENTS

| CN | 106735888 A | 5/2017 |
| JP | S6435579 A | 2/1989 |
| JP | H0788669 A | 4/1995 |

OTHER PUBLICATIONS

European Search Report for EP18020236 dated Jul. 24, 2018; dated Aug. 3, 2018.
(Continued)

*Primary Examiner* — Scott R Kastler
(74) *Attorney, Agent, or Firm* — Millen White Zelano & Branigan, PC; Brion P. Heaney

(57) ABSTRACT

The invention relates to an ozone supply unit (26) for a flame burner apparatus and/or an oxygen cutting apparatus (10), comprising an oxygen inlet (28) to be supplied with oxygen (18), an ozone generator (32) coupled to the oxygen inlet (28) and configured to convert at least a part of the oxygen (18) supplied to the oxygen inlet (28) into ozone (18a), and an outlet (30) coupled to the ozone generator (32), wherein the outlet (30) provides at least a part of the oxygen (18) supplied to the oxygen inlet (28) and at least a part of the ozone (18a) converted by the ozone generator (32). The ozone supply unit (26) is configured to be integrated into a flame burner apparatus and/or an oxygen cutting apparatus (30). The invention further relates to a method for supplying ozone to a flame burner apparatus and/or an oxygen cutting apparatus (30).

20 Claims, 1 Drawing Sheet

(51) Int. Cl.
   *C01B 13/10* (2006.01)
   *F23D 14/46* (2006.01)
   *B23K 26/38* (2014.01)
   *B23K 7/00* (2006.01)
   *B23K 7/08* (2006.01)
   *B23K 26/70* (2014.01)
   *F23D 14/32* (2006.01)
   *B23K 26/14* (2014.01)
   *F23D 14/42* (2006.01)
   *F23L 7/00* (2006.01)

(52) U.S. Cl.
   CPC .............. *B23K 26/14* (2013.01); *B23K 26/38* (2013.01); *B23K 26/702* (2015.10); *C01B 13/10* (2013.01); *F23D 14/32* (2013.01); *F23D 14/42* (2013.01); *F23D 14/465* (2013.01); *F23L 7/00* (2013.01); *C01B 2201/64* (2013.01)

(58) Field of Classification Search
   CPC . C01B 3/10; C01B 13/10; F23D 14/32; F23D 14/23; F23D 14/42
   See application file for complete search history.

(56) References Cited

U.S. PATENT DOCUMENTS

| | | |
|---|---|---|
| 6,469,274 B1 | 10/2002 | Delzenne et al. |
| 2004/0071614 A1 | 4/2004 | Kravitz et al. |
| 2017/0328314 A1 | 11/2017 | Kuegerl et al. |

OTHER PUBLICATIONS

Database WPI, Week 199014, AN1990-099801, XP002783268, Mar. 29, 1989.
Databse WPI, Week 198306, AN1983-14238K, XP002783269, Apr. 5, 1982.
Database WPI, Week 198240, AN 1982-85524E, XP002783270, Dec. 7, 1981.
English Abstract of JPH0788669, Publication Date: Apr. 4, 1995.
English Machine Translation of CN106735888, Publication Date: May 31, 2017.

\* cited by examiner

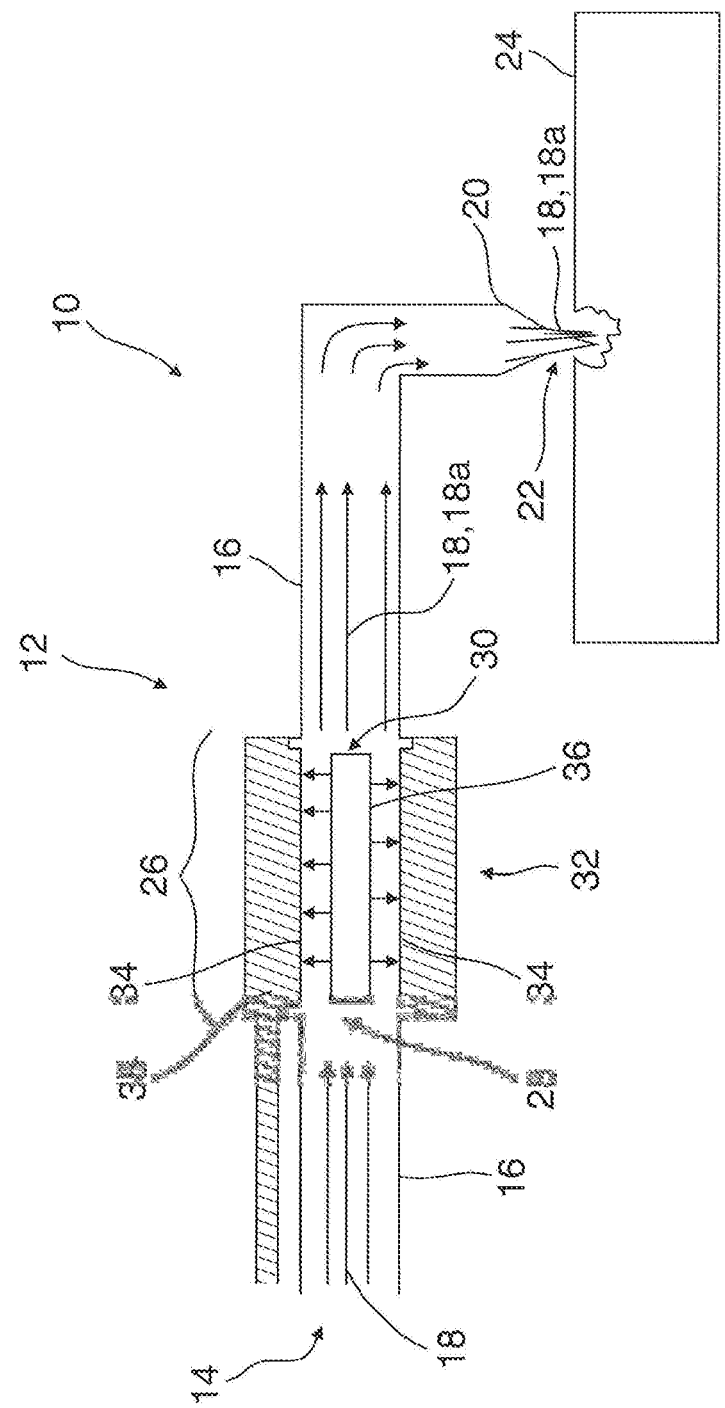

OZONE SUPPLY UNIT AND METHOD FOR PROVIDING OZONE FOR A FLAME BURNER APPARATUS AND/OR FOR AN OXYGEN CUTTING APPARATUS

FIELD OF THE INVENTION

The present invention essentially relates to an Ozone supply unit and method for providing ozone for a flame burner apparatus and/or for an oxygen cutting apparatus, as well as to a flame burner apparatus and an oxygen cutting apparatus. In particular, the invention relates to the field of oxygen-based cutting technologies.

BACKGROUND OF THE INVENTION

Oxygen-based cutting technologies in steel particularly rely on specific properties of steel, such that an oxygen gas jet reacts with the steel, thereby combusting it and forming a liquid iron oxide which can be removed from the cut by the sheer force of the oxygen jet.

For an efficient oxygen cutting process a self-ignition temperature in a pure oxygen atmosphere of the metal to be cut must be below the melting point of the metal, wherein an oxygen atmosphere is considered as pure if it has a purity of at least 99.5% (eventually including also ozone within this 99.5%). In addition, the metal oxide has to have a lower melting point or lower melting temperature than the metal to be cut. Furthermore, at the self-ignition temperature the metal oxide should be liquid and preferably have a low viscosity to allow the sheer forces provided by the oxygen gas jet to take away the liquid metal oxide. Moreover, the metal should have a poor thermal conductivity in order to maintain the heat of the combustion in the cutting zone but not to distribute the heat over a large volume of the metal. Finally, the metal combustion process must be highly exothermal in order to produce substantial amounts of heat for the self-ignition of the combustion and for melting the metal oxide.

These requirements are met by iron and many iron based materials, such as steel. Therefore, oxygen-based cutting technologies are widely used for cutting iron and/or steel objects by means of a oxygen cutting apparatus. Typically, a separate heat source is provided for bringing the iron or iron-based metal at its surface to its auto-ignition temperature to start the combustion and, thus, the cutting process, after which the heat from the combustion of the iron or iron-based metal with the oxygen jet produces sufficient heat for the cut to proceed downwards in the iron or iron-based metal.

For instance, the heat can be provided by a heat source comprising a flame, which is provided for instance by combusting a fuel gas, such as propane and/or acetylene, in a pure oxygen environment, or a focused laser beam. Some cutting processes use ozone ($O_3$) instead of or in addition to regular oxygen ($O_2$) for increasing the reactivity of the oxygen and/or improving the cutting speed. For instance, a portion of the supplied oxygen used for cutting may be converted into ozone before providing it to the combustion. For this purpose, an ozone reactor can be used, which converts pure oxygen ($O_2$) for instance from a cryogenic or compressed pure oxygen source, i.e. at least a part of the pure oxygen, into ozone to supply the combustion with an ozone-enriched oxygen. In the following, oxygen shall denote the diatomic form of oxygen ($O_2$), while ozone shall denote $O_3$.

For instance, JPS6434579A describes the use of ozone in flame cutting and beam cutting especially for high alloyed steels. US 2004/0071614A describes an ozone generator for combustion and oxygenation processes.

In general, the use of ozone in cutting processes, such as by means of standard cutting heads, for example a laser beam cutting head or an oxygen-acetylene torch, is performed by using an ozone enriched oxygen stream. Thereby, the supply lines and also the cutting heads are required to be adapted for the use of ozone-enriched oxygen due to the higher reactivity of ozone as compared to oxygen.

It is therefore the objective technical problem to provide means and a method for a facilitated use of ozone and/or ozone-enriched oxygen in cutting processes.

DISCLOSURE OF THE INVENTION

This objective technical problem is solved by an ozone supply unit, an oxygen cutting apparatus, a flame burner apparatus, and a method having the features of the respective independent claims. Preferred embodiments are subject-matter of the dependent claims and the subsequent description.

In one aspect the invention relates to an ozone supply unit for a flame burner apparatus and/or an oxygen cutting apparatus, the ozone supply unit comprising an oxygen inlet to be supplied with oxygen, an ozone generator coupled to the oxygen inlet and configured to convert at least a part of the oxygen supplied to the oxygen inlet into ozone, and an outlet coupled to the ozone generator, wherein the outlet provides at least a part of the oxygen supplied to the oxygen inlet and at least a part of the ozone converted by the ozone generator. The ozone supply unit is configured to be integrated into a flame burner apparatus and/or an oxygen cutting apparatus.

In another aspect the invention relates to an oxygen cutting apparatus comprising an ozone supply unit according to the present invention.

In another aspect the invention relates to a flame burner apparatus for comprising an ozone supply unit according to the present invention.

In another aspect the invention relates to a method for providing ozone for a flame burner apparatus and/or for an oxygen cutting apparatus, the method comprising supplying oxygen to the flame burner apparatus and/or to the oxygen cutting apparatus. The method further comprises converting at least a part of the oxygen supplied to the flame burner apparatus and/or to the oxygen cutting apparatus into ozone by means of a ozone supply unit within the flame burner apparatus or the oxygen cutting apparatus, respectively, and providing at least a part of the ozone converted by the ozone supply unit and at least a part of the non-converted oxygen to a combustion process via the flame burner apparatus or to an oxygen cutting process via the oxygen cutting apparatus, respectively.

The ozone supply unit may be configured to supply a flame burner apparatus and/or an oxygen cutting unit with pure ozone and/or with ozone-enriched oxygen. In other words, the ozone supply unit may be configured to convert most of the oxygen provided at the oxygen inlet to ozone and/or to convert only a portion of the oxygen provided at the oxygen inlet to ozone. The ozone or ozone-enriched oxygen generated by the ozone generator may be provided as such to the flame burner apparatus and/or the oxygen cutting apparatus or in combination with further (regular, i.e. diatomic) oxygen supplied by another oxygen supply.

A flame burner apparatus may be an apparatus for cutting and/or welding and/or heating metal objects. The flame burner apparatus may be configured to provide a flame for transferring heat to the metal object. For generating the flame, the flame burner apparatus may be configured to burn a fuel, particularly a fuel gas, such as propane or acetylene, together with oxygen, ozone-enriched oxygen and/or pure ozone. Throughout this application "pure ozone" denotes ozone having a purity of at least 99.5%.

An oxygen cutting apparatus may be an apparatus for cutting metal objects essentially by means of an oxygen jet. "Essentially by means of an oxygen jet" means that the cutting process is driven by a local combustion of the metal object to be cut when reacting with the oxygen jet, wherein other heating means might be applied for preheating the metal objects or parts of it to a self-ignition temperature to start the self-combustion of the metal object under the oxygen jet. The oxygen cutting apparatus may be used with oxygen, ozone-enriched oxygen and/or pure ozone, wherein the oxygen cutting apparatus is preferably used with ozone enriched oxygen.

The ozone supply unit being configured to be integrated into a flame burner apparatus and/or into an oxygen cutting apparatus means that the ozone supply unit is configured, particularly with respect to its spatial dimensions, to fit into a flame burner apparatus and/or into an oxygen cutting apparatus. Although also the flame burner apparatus and/or oxygen cutting apparatus may be modified to incorporate the ozone supply unit, the ozone supply unit may have a particularly compact structure and/or shape allowing the ozone supply unit to be integrated into a flame burner apparatus and/or an oxygen cutting apparatus.

The invention provides the advantage that the ozone supply unit and, thus, the ozone-generating mechanism can be integrated for instance in a cutting machine, such as a flame burner apparatus and/or an oxygen cutting apparatus, and therefore no separate ozone generator needs to be provided. By this, the complexity of a cutting machine can be reduced and/or the manufacturing costs can be reduced. Furthermore, the length of a supply line, comprising for instance tubes, and/or the number of other parts, which must fulfill special requirements to be suitable for the use with ozone, can be reduced therefore further reducing the technical complexity and/or the manufacturing costs.

Furthermore, the invention provides the advantage that the length of a supply line for providing ozone to a combustion and/or to an outlet of a flame burner apparatus and/or an oxygen cutting apparatus can be reduced. This provides the benefit, that the generated or converted ozone, which is converted from oxygen by the ozone supply unit, experiences less decay back to oxygen, since the transport length for the converted ozone and, thus, the available time for decaying back to oxygen is limited and reduced, as compared to conventional system having longer transport lengths for the ozone generated by a separate ozone generator. Consequently, the efficiency of the ozone supply can be increased. Due to this increased efficiency, a higher ozone ratio can be provided to the combustion and/or a smaller ozone generator may be sufficient for providing the required or desired ozone amount or ratio in the oxygen supplied to the combustion. In other words, the ozone can be produced closer to the combustion process, as compared to the prior art, thus, optimising the ozone yield. This also provides the benefit that the reaction time for adjusting the ozone generation and/or the ozone portion in oxygen supplied to a flame burner apparatus and/or an oxygen cutting apparatus can be significantly reduced, therefore providing a fast responding flame burner apparatus and/or a fast responding oxygen cutting apparatus.

Further, the invention offers the benefit that the oxygen provided to the oxygen inlet of the ozone supply unit, in particular the portion which might not be converted by the ozone generator, can take up waste heat from the ozone generator and by this contribute to an efficient cooling of the ozone generator. Moreover, this provides also the beneficial effect that the oxygen contributing to taking away the waste heat from the ozone generator is preheated, which may increase the oxidation reaction with the metal and, thus, the combustion.

In addition, the invention provides the advantage that a simple process control can be achieved, since the cutting performance of a flame burner apparatus and/or an oxygen cutting apparatus can be at least partially adjusted by means of controlling the parameters of the ozone generator. Since the ozone generator preferably is based on a high electrical voltage in a reaction chamber between at least two electrodes, electrical parameters of the ozone generator, such as the voltage applied to the electrodes, can be suitable for controlling the amount of converted oxygen and, thus, the generated ozone and, thus, for controlling at least partially the efficiency of the cutting process.

Moreover, when using the ozone supply unit for supplying ozone to a flame burner apparatus, at least a portion of the ozone generated by the ozone generator can be used also for combustion enhancement in the combustion generated by the flame burner apparatus. Beyond enhancement of thermal effects, preferably undesired $NO_x$ and $CO_2$ emissions can be reduced, as the fuel combustion with ozone might reduced these undesired emissions.

Preferably the oxygen cutting apparatus comprises a cutting head, wherein preferably the ozone supply unit is integrated in the cutting head. Preferably, the flame burner apparatus comprises a burner head, wherein most preferably the ozone supply unit is integrated in the burner head. Preferably the ozone supply unit is configured to be integrated in a cutting head of the oxygen cutting apparatus and/or configured to be integrated in a burner head of the flame burner apparatus. This provides the advantage that the distance or length of the supply line for ozone from the generator to the combustion process can be minimized, because the ozone generation preferably occurs at the end stage of the flame burner apparatus and/or the oxygen cutting apparatus. Furthermore, the reaction time of the flame burner apparatus and/or an oxygen cutting apparatus with respect to and adjustment of the ozone portion or ratio provided can be minimized, thereby facilitating the control of the flame burner apparatus and/or the oxygen cutting apparatus.

Preferably the ozone supply unit is configured to be integrated in an oxygen supply line of the oxygen cutting apparatus and/or in an oxygen supply line of the flame burner apparatus. This provides the advantage that no separate supply line for oxygen to and from the ozone generator needs to be provided. The oxygen supply line can be arranged at least partially in the cutting head and/or the burner head.

Preferably the ozone generator comprises at least two electrodes arranged between the oxygen inlet and the outlet and wherein the electrodes are connectable to a power source and are configured to generate a plasma between the at least two electrodes. The space between the electrodes may be referred to as a reaction chamber. This allows the ozone generation being efficiently performed by applying a voltage between the electrodes. The benefit of providing electrodes between the oxygen inlet and the outlet is that the ozone generator can be installed locally as a device having only small spatial dimensions, since the distance of the electrodes can be small, for instance in a range between 1 mm and 10 mm. The smaller the distance, the higher the electric field between the electrodes will be at a given voltage applied between the electrodes. Therefore, the generation of ozone is facilitated by electrodes having a small distance in-between. Consequently, an efficient ozone generation can be achieved with a compact ozone generator integrated for instance in the cutting head and/or the burner head. Preferably converting or transforming at least a part of the supplied oxygen into ozone comprises generating a plasma between at least two electrodes comprised by the ozone supply unit.

Preferably the oxygen inlet of the ozone supply unit is in direct communication with an oxygen inlet of the cutting head and/or the outlet of the ozone supply unit is in direct communication with an outlet nozzle of the cutting head. In other words, the ozone supply unit may be integrated in the oxygen supply line of a cutting head and/or a burner head. By this, the complexity of the respective apparatus can be reduced and the length of the oxygen and ozone supply line can be minimized.

In another preferred embodiment, an ozone supply unit may comprise a reaction chamber formed by a double-walled tube surrounded by an intense source of UV radiation, for instance by gas discharge lamps and/or LEDs. In this case, an outer cylinder of the double-walled tube is preferably made from a material, which is at least partially transparent for the UV radiation, such as fused silica.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

BRIEF DESCRIPTION OF THE DRAWINGS

FIG. 1 shows an oxygen cutting apparatus according to a preferred embodiment of the invention.

DETAILED DESCRIPTION OF THE DRAWINGS

FIG. 1 shows an oxygen cutting apparatus 10 according to a preferred embodiment of the invention. The oxygen cutting apparatus 10 comprises a cutting head 12 having an oxygen inlet 14 to be supplied with oxygen ($O_2$), preferably with pure oxygen. The oxygen supply line 16 is configured for guiding the oxygen 18 from the oxygen inlet 14 of the cutting head 12 via an outlet nozzle 20 to a combustion zone 22, in which the oxygen 18 combusts with a metal of a metal piece 24 for cutting through the metal piece 24.

In addition, the cutting head 12 comprises an ozone supply unit 26, which is integrated in the cutting head 12. Between an oxygen inlet 28 of the ozone supply unit 26 and an outlet 30 of the ozone supply unit 26 an ozone generator 32 is arranged, which is configured to convert at least a portion of the oxygen 18 streaming via the oxygen inlet 28 of the ozone supply unit 26 through the ozone supply unit 26 to the outlet 30 of the ozone supply unit 26. The ozone generator 32 comprises two electrodes 34, to which a voltage can be applied for generating a plasma between the electrodes 34. In addition, the ozone generator 32 includes a dielectric member 36, which is arranged concentrically with the electrodes 34 to generate gaps of a limited width, through which the oxygen 18 can stream through the ozone generator 32. The gaps of limited width form a reaction chamber 37, in which the plasma is created. This provides the benefit that the electric field between the dielectric member 36 and the adjacent electrode 34 can be increased for a predetermined voltage between the electrodes 34. The electrodes 34 and/or the dielectric member 36 and, thus, the reaction chamber 37 may have a rotational symmetric shape, such as a cylindrical shape, and may be arranged in a concentric manner. The ozone supply unit 26 may comprise electrical contacts to be connected with an electric power supply to provide the voltage and electric energy for operating the ozone generator 32.

An electric discharge between the two walls generates ozone in the oxygen flow in the reaction chamber 37. The dielectric member 36 facilitates the generation of ozone.

While streaming through the ozone generator 32 and in particular through the reaction chamber, at least a part of the oxygen 18 is converted into ozone 18a, which leaves the ozone generator 32 at the outlet 30 and is transported to the outlet nozzle 20. Due to the integrated arrangement of the ozone supply unit 26 into the cutting head, the distance and transport time of the ozone 18a from the ozone generator 32 to the outlet nozzle 20 can be minimized.

Furthermore, the cutting head 12 includes a cooling system 38 providing a cooling liquid, such as for instance water, to the electrodes 34 in order to take up waste heat from the electrodes to prevent overheating of the electrodes 34 and the ozone generator 32. The cooling system 38 may be configured to provide a preferably constant flow of cooling liquid around the electrodes 34. In addition, at least a part of the waste heat generated by the electrodes 38 may be absorbed by the oxygen 18 streaming through the ozone generator 32, particularly by the portion of the oxygen 18 which is not converted into ozone 18a. This provides the advantage that at least the portion of oxygen 18, which is not converted into ozone 18a, is preheated which may be beneficial for the combustion process occurring at the contact surface of the metal piece 24 with the oxygen 18 and the ozone 18a.

In another preferred embodiment, the oxygen cutting apparatus 10 may have an additional heat source (not shown), such as a laser source, for preheating the metal piece 24 to the self-ignition temperature of the metal with pure oxygen.

In a further embodiment, the ozone supply unit may be integrated in a flame burner head (not shown). The flame burner head may exhibit in addition to the oxygen and ozone supply a supply line for a fuel gas, which is then for instance ejected by the nozzle as a jet together with the oxygen and ozone to combust and generate a flame. The ozone supply unit may be integrated in a respective oxygen supply line, as shown in FIG. 1 with reference to an oxygen cutting head. Alternatively, the ozone supply unit 26 may be integrated in a plasma cutting apparatus (not shown), wherein a part of the cutting current may be used to generate the ozone by a corona or an arc.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Great Britain application No. 1802685.6, filed Feb. 20, 2018 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

REFERENCE SIGNS 10 oxygen cutting apparatus
12 cutting head
14 oxygen inlet
16 oxygen supply line
18 oxygen
18a ozone
20 outlet nozzle
22 combustion zone
24 metal piece
26 ozone supply unit
28 oxygen inlet of the ozone supply unit
30 outlet of the ozone supply unit
32 ozone generator
34 electrode
36 dielectric member
37 reaction chamber
38 cooling system

The invention claimed is:

1. An ozone supply unit (26) for a flame burner apparatus and/or an oxygen cutting apparatus (10), comprising:
   an oxygen inlet (28) to be supplied with oxygen (18);
   an ozone generator (32) coupled to the oxygen inlet (28) and configured to convert at least a part of the oxygen (18) supplied to the oxygen inlet (28) into ozone (18a), wherein the ozone generator (32) comprises two electrodes (34) arranged between the oxygen inlet (28) and the outlet (30) and wherein the electrodes (34) are connectable to a power source and are positioned so that a plasma can be generated between the two electrodes (34);
   an outlet (30) coupled to the ozone generator (32) for discharging from the ozone supplying unit (a) at least a part of the oxygen (18) that was supplied to the oxygen inlet (28) and not converted into ozone in the ozone generator and (b) at least a part of the ozone (18a) formed by the ozone generator (32); and
   a dielectric member (36), arranged concentrically with the two electrodes (34) forming gaps through which the supplied oxygen (18) can stream through the ozone generator (32), the gaps forming a reaction chamber (37) in which the plasma is generated.

2. A method for providing ozone for a flame burner apparatus or for an oxygen cutting apparatus (10), the method comprising:
   supplying oxygen (18) to the flame burner apparatus or to the oxygen cutting apparatus (10),
   wherein said oxygen cutting apparatus comprises a cutting head, an oxygen supply line, and an ozone supply unit (26), wherein said ozone supply unit (26) is integrated in the cutting head and/or the oxygen supply line, and said flame burner apparatus comprises a burner head, an oxygen supply line, and an ozone supply unit, wherein said ozone supply unit (26) is integrated in the burner head and/or the oxygen supply line;
   converting at least a part of the oxygen (18) supplied to the flame burner apparatus or to the oxygen cutting apparatus (10) into ozone (18a) by generating a plasma between the at least two electrodes of the ozone supply unit (26); and
   providing at least a part of the ozone (18a) converted by the ozone supply unit (26) and at least a part of the non-converted oxygen (18) to a combustion process via the flame burner apparatus or to an oxygen cutting process via the oxygen cutting apparatus (10), respectively,
   wherein the ozone supply unit (26) comprises: an oxygen inlet (28) to be supplied with oxygen (18); an ozone generator (32) coupled to the oxygen inlet (28) and configured to convert at least a part of the oxygen (18) supplied to the oxygen inlet (28) into ozone (18a); and an outlet (30) coupled to the ozone generator (32) for discharging from the ozone supplying unit (a) at least a part of the oxygen (18) that was supplied to the oxygen inlet (28) and not converted into ozone in the ozone generator and (b) at least a part of the ozone (18a) formed by the ozone generator (32);
   wherein the ozone supply unit (26) is integrated in a cutting head (12) of an oxygen cutting apparatus or is integrated in a burner head of a flame burner apparatus;
   wherein the ozone generator (32) of the ozone supply unit (26) comprises two electrodes (34) arranged between the oxygen inlet (28) and the outlet (30) and further comprises a dielectric member (36), arranged concentrically with the two electrodes (34) forming gaps through which the supplied oxygen (18) can stream through the ozone generator (32), the gaps forming a reaction chamber (37) in which the plasma is generated, and
   wherein the converting of at least a part of the supplied oxygen (18) into ozone comprises generating a plasma within said reaction chamber (37).

3. The ozone supply unit according to claim 1, wherein the ozone supply unit is integrated into a flame burner apparatus or is integrated into an oxygen cutting apparatus.

4. The ozone supply unit according to claim 1, wherein the ozone supply unit is integrated into a cutting head of an oxygen cutting apparatus or is integrated into a burner head of a flame burner apparatus.

5. The ozone supply unit according to claim 1, wherein the ozone supply unit is integrated into an oxygen supply line of an oxygen cutting apparatus or into an oxygen supply line of a flame burner apparatus.

6. An oxygen cutting apparatus comprising a cutting head, an oxygen supply line, and an ozone supply unit which is integrated into the cutting head or into the oxygen supply line, wherein said ozone supply unit is according to claim 1.

7. The oxygen cutting apparatus according to claim 6, further comprising a cutting head, wherein the ozone supply unit is integrated into the cutting head.

8. The oxygen cutting apparatus according to claim 7, wherein the oxygen inlet of the ozone supply unit is in direct communication with an oxygen inlet of the cutting head and/or wherein the outlet of the ozone supply unit is in direct communication with an outlet nozzle of the cutting head.

9. A flame burner apparatus comprising a burner head, an oxygen supply line, and an ozone supply unit which is integrated into the burner head or into the oxygen supply line, wherein said ozone supply unit is according to claim 1.

10. The ozone supply unit (26) according to claim 1, wherein the distance between the two electrodes (34) is between 1 mm and 10 mm.

11. The method according to claim 2, wherein the ozone supply unit is integrated into a flame burner apparatus or is integrated into an oxygen cutting apparatus.

12. The method according to claim 2, wherein the ozone supply unit is integrated into a cutting head of an oxygen cutting apparatus or is integrated into a burner head of a flame burner apparatus.

13. The method according to claim 12, wherein the ozone supply unit is integrated into the cutting head of the oxygen cutting apparatus.

14. The method according to claim 12, wherein the ozone supply unit is integrated in the burner head of the flame burner apparatus.

15. The method according to claim 2, wherein the ozone supply unit is integrated into an oxygen supply line of an oxygen cutting apparatus or into an oxygen supply line of a flame burner apparatus.

16. The method according to claim 15, wherein the ozone supply unit is integrated in the oxygen supply line of the oxygen cutting apparatus.

17. The method according to claim 15, wherein the ozone supply unit is integrated in the oxygen supply line of the flame burner apparatus.

18. The method according to claim 13, wherein the oxygen inlet of the ozone supply unit is in direct communication with an oxygen inlet of the cutting head and/or wherein the outlet of the ozone supply unit is in direct communication with an outlet nozzle of the cutting head.

19. The method according to claim 2, wherein the distance between the two electrodes (34) is between 1 mm and 10 mm.

20. The method according to claim 2, wherein the amount of oxygen converted into ozone is controlled by the amount of voltage applied to the electrodes.

* * * * *